Jan. 18, 1944. O. L. RICE 2,339,584
METHOD OF CUTTING AND WRAPPING CAKE
Filed March 1, 1941

INVENTOR.
Orrie L. Rice
BY Lieber & Lieber
ATTORNEYS.

Patented Jan. 18, 1944

2,339,584

UNITED STATES PATENT OFFICE 2,339,584

METHOD OF CUTTING AND WRAPPING CAKE

Orrie L. Rice, Wood-Ridge, N. J., assignor to Milprint, Inc., Milwaukee, Wis., a corporation of Delaware Application March 1, 1941, Serial No. 381,408

2 Claims. (Cl. 99—171)

The present invention relates in general to improvements in the art of preparing and packaging commodities for marketing, and relates more specifically to an improved method of cutting objects into segments and of wrapping the severed objects protectively.

An object of the invention is to provide a new and useful method of severing objects such as cakes into a group of individual sections and of enwrapping the group as a unit in a protective wrapper.

Another object of my invention is to provide an improved package wherein an object such as a cake pre-cut into sections is effectively confined, while maintaining the individual sections segregated from each other.

It has heretofore been common commercial practice to slice loaves of bread or the like, prior to wrapping thereof for subsequent handling, transportation and marketing. This procedure is relatively simple and free from difficulty when used in connection with bread loaves or the like, since this commodity is relatively dry and free from sticky substances which would tend to cause the slices to adhere to each other or to the wrapper. When it is attempted to pre-cut or slice confections such as cake wherein relatively sticky and fluent ingredients are often used in the body, as a coating and between layers, it is necessary to provide some means for retaining the severed sections in segregated condition so that the ultimate consumer will not be obligated to re-cut the commodity. In order to avoid waste of time, and to insure uniform cutting and to eliminate undesirable distortion of relatively soft cakes, it is also desirable to sever all of the sections simultaneously, and this procedure introduces difficulties especially when applied to round cakes. If the cakes are coated with frosting, icing, or otherwise, the wrapper will also tend to cling to the coating unless some means for preventing such action, are provided. It has therefore been impractical with prior cutting and wrapping methods, to pre-cut and wrap many kinds of edible commodities, and especially fresh cakes.

The present invention contemplates provision of a simple, yet highly efficient method of pre-slicing and of enwrapping cakes or the like in protective and attractive wrappers.

Another object of this invention is to provide an improved method whereby circular cakes or the like may be cut into a group of equal-size pieces, and the cut portions may be maintained in segregated condition.

A further object of the present invention is to provide a method of insuring neat and clean pre-cutting of an object such as a cake having relatively sticky ingredients therein or thereon, into a plurality of uniform sections, without undesirably mutilating the object.

Still another object of my invention is to provide an improved method of wrapping cakes coated with frosting or the like, in a thin transparent wrapper and in such manner that the wrapper will not contact the coating.

An additional object of the invention is to provide an improved parcel comprising a coated cake or the like segregated into sections of definite size, and wherein the segregated parts are effectively separated from each other and are devoid of external direct contact with the enclosing wrapper.

Another additional object of my invention is to provide a highly attractive and protective package for commodities such as fresh cakes, which can be rapidly and conveniently produced.

These and other bjects and advantages of the invention will be apparent from the following detailed description.

A clear conception of the several steps involved in my improved wrapping method, and of the construction of a package resulting from use of the process, may be had by referring to the drawing accompanying and forming a part of this specification, wherein like reference characters designate the same or similar parts in the various views.

While the improved method has been described herein as being specifically applied to the cutting and wrapping of a circular frosted layer cake to produce a display package of unique construction, it will be apparent that the method may be equally and advantageously practiced in respect to diverse other commodities or objects having different shapes and other characteristics.

Figure 1:
Fig. 1 is a rather diagrammatic perspective view of a typical cylindrical layer cake, resting upon a supporting disk.

My improved method may be readily and quickly applied in pre-cutting and wrapping cakes, and in Fig. 1 of the drawing is shown a typical fresh circular layer cake 10 resting upon a circular supporting plate or disk 11 of cardboard, thin metal, or other suitable material. The cake 10 may or may not be frosted or otherwise coated, and may also have beds of icing, custard or the like between layers, and is preferably in fresh condition, and as a rule these cakes contain ingredients which make either the interiors or exteriors thereof relatively sticky.

Figure 2:
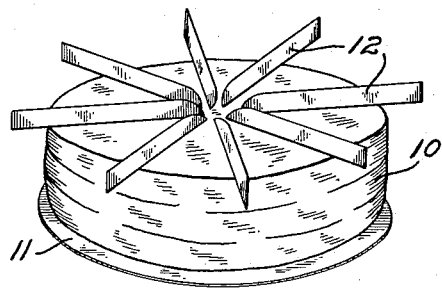
Fig. 2 is a similar diagram depicting the initial act of positioning the severing knives above the cake.
Figure 3:
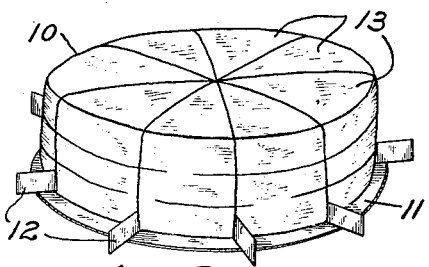
Fig. 3 is another similar view illustrating the step of simultaneously cutting the cake into a group of radiating sections.

When carrying on the improved pre-cutting or slicing method, I preferably provide a series of sharp blades or knives 12 radiating from a common center and adapted to be simultaneously lowered and subsequently withdrawn radially from the common center, by any suitable mechanism. In actual practice I have suspended a set of knives 12 of sufficient length for various size cakes 10, from a vertically movable horizontal disk provided with spiral slots coacting with projections on the individual knives so as to simultaneously move all of the lowered blades radially outwardly when the supporting disk is rotated a short distance. The fresh cake 10 may first be positioned centrally beneath the group of knives 12 as depicted in Fig. 2 of the drawing, whereupon the set of sharp blades may be simultaneously gently lowered through the body of the cake 10 as illustrated in Fig. 3, until they reach the supporting plate 11. The cake 10 will thus be quickly and effectively cut into a group of sectors 13 of uniform size and shape, all radiating from the common cake center, so that they may be subsequently readily removed with a cake knife or the like.

Figure 4:
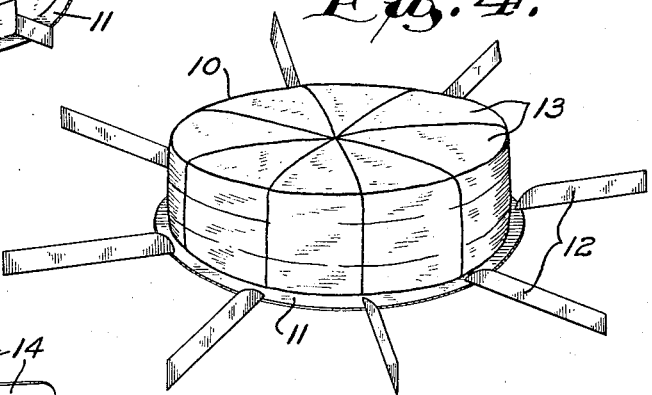
Fig. 4 is still another similar disclosure, showing the knives after having been withdrawn from the cut cake.

When the knife blades 12 have been thus lowered through the cake body and the cutting has been completed, it is impractical to elevate the cutters vertically away from the supporting disk 11, for removal, as such procedure would break the sectors 13 and cause them to spread apart. I therefore withdraw the knives 12 radially from the bottom of the cake 10 as shown in Fig. 4, until all of the blades clear the periphery of the cake, whereupon the knife assembly may be lifted away from the previously pre-cut cake and prepared for the cutting of a subsequent similar object. Such withdrawal or removal of the knives 12 does not objectionably disrupt or separate the pieces or sectors 13, and leaves clean cuts between the adjacent segments.

Figure 5:
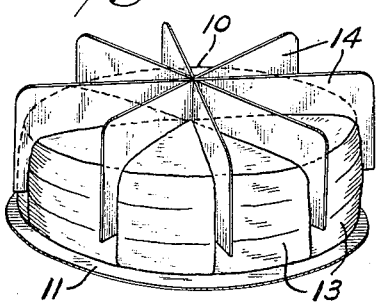
Fig. 5 is a perspective view of the severed cake, and illustrating the mode of applying the section segregating partitions.
Figure 6:
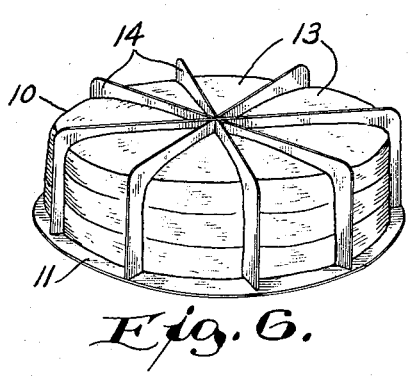
Fig. 6 is a similar view showing the division partitions fully inserted.

After the cake 10 has been thus severed into separate sectors 13, it is desirable in most cases to quickly and positively segregate the sections from each other. This segregation is easily accomplished by inserting dividing plates or partitions 14 within the radial cuts between the sectors 13, and these partitions may be applied either individually or in pre-arranged groups as shown in Fig. 5. The partitions 14 may be formed of any suitable sheet material such as cardboard or thin metal, and they should preferably be applied to the cake 10 as quickly as possible after the cutting operation has been completed. It is also preferable in most cases, to form the partitions 14 of such size, that they will project outwardly beyond the periphery and top of the cake 10, when they have been inserted in the cut cake and contact with the supporting disk 11 as illustrated in Fig. 6. This outward projection of the partitions 14 has been somewhat exaggerated in Fig. 6, and is especially desirable when wrapping iced or frosting coated cakes 10.

Figure 7:
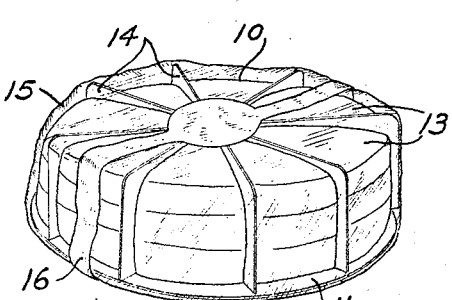
Fig. 7 is a perspective view of the final package.

When the segregating partitions 14 have been properly applied to the pre-cut cake 10, the assemblage may be finally enclosed within a suitable wrapper 15 as shown in Fig. 7. The wrapper 15 may be formed of any suitable sheet material such as regenerated cellulose or rubber hydrochloride film, either opaque or transparent, and may be held in place by one or more adhesive bands 16 or the like. These wrappers may also be attractively decorated and provided with printed indicia, so as to produce neat and highly attractive final packages; and it will be noted that the outer and upper projecting edge portions of the partitions 14 will effectively prevent the wrappers 15 from contacting the peripheral and top surfaces of the enwrapped cakes 10, especially if the wrapper is pulled rather taut over these partitions. If so desired, an encircling band may also be applied to the lower portion of the wrapper sheet 15 around the periphery of the supporting disk 11.

The finally wrapped cakes 10 will be effectively enclosed and protected by the confining wrappers 15, and these wrappers may be quickly removed without marring the appearance of the cakes. When the wrapper 15 has been removed from a cake 10, each of the severed sectors 13 may be withdrawn from the cake assemblage, without disturbing the others, since the partitions 14 will maintain the several sections effectively separated at all times. These partitions 14 therefore perform the dual function of keeping the cut portions separated from each other and in proper shape, and of preventing the wrapper 15 from contacting the outer sticky surfaces of the cake 10.

From the foregoing detailed description it will be apparent that the present invention provides a simple and highly effective method of pre-cutting and of wrapping objects such as cake so as to produce highly attractive and protective improved final packages. The improved method of cutting the cake into a group of individual sections or sectors of predetermined size and shape, may be quickly carried on with least damage to the object, by simultaneously cutting all of the sectors with a group of cutters or knives adapted to be withdrawn longitudinally upon completion of each cut; and this method is especially applicable to circular cakes or the like. The improved method of retaining the cut sections or sectors in segregated condition, is likewise extremely simple and effective, and the separating partitons not only maintain the sectors segregated from each other, but also subsequently protect the cake from undesirable contact with the wrapper sheet. The improved packages produced by the present improved method are most effective in every respect, and the invention has proven highly successful and satisfactory in actual commercial use. The specific term "cake" as used herein, is intended to include any object having characteristics similar to those of the edible confection ordinarily designated by that name, and these cakes may assume diverse shapes other than that herein specifically shown and described.

It should be understood that it is not desired to limit this invention to the exact details of construction of the package, or to the precise steps of the method, herein shown and described, for various modifications within the scope of the claims may occur to persons skilled in the art.

I claim:

1. The method of cutting cake and of protecting the severed sections, which comprises, mounting a cake upon a supporting plate the edge portion of which projects outwardly beyond the cake bottom, severing the cake into a group of sections by simultaneously lowering elongated approximately horizontal cutters downwardly through the cake body and subsequently withdrawing the cutters longitudinally when lowered in proximity to said plate, promptly thereafter inserting division partitions of larger area than the zones of severance between the cut sections so that the lower edges of the partitions engage said plate and the upper and outer edges of all of the partitions project outwardly beyond the adjacent outer surfaces of the cake, and finally applying a wrapper sheet over the cake in contact with the upper and outer edges of said partitions and with the outer edge of said plate, said wrapper sheet being spaced by the projecting portions of said partitions from all external surfaces of the cake sections to prevent said wrapper sheet from adhering thereto.

2. The method of cutting cake and of protecting the severed sections, which comprises, mounting a circular cake upon a supporting disk the circumferential edge of which projects outwardly beyond the cake bottom, severing the cake into a group of sectors by simultaneously lowering elongated approximately horizontal cutters radiating from the central cake axis downwardly through the cake body and subsequently withdrawing the cutters radially when lowered in proximity to said disk, promptly thereafter inserting a group of partitions radiating from an axis and of larger areas than the zones of severance between the cut sectors so that the lower edges of the partitions engage said disk, the upper and outer edges of all of said partitions projecting outwardly beyond the adjacent outer surfaces of the cake, and finally applying a wrapper sheet over the cake in contact with the upper and outer edges of said partitions and with the outer peripheral edge of said disk, said wrapper sheet being spaced by the projecting portions of said partitions from all external surfaces of the cake sectors to prevent said wrapper sheet from adhering thereto.

ORRIE L. RICE.